Aug. 28, 1951 S. S. L. CHANG ET AL 2,566,116
MACHINE FOR FORMING A DISK-LIKE
WORKPIECE WITH SPIRAL THREADS
Filed Feb. 25, 1950 3 Sheets-Sheet 3

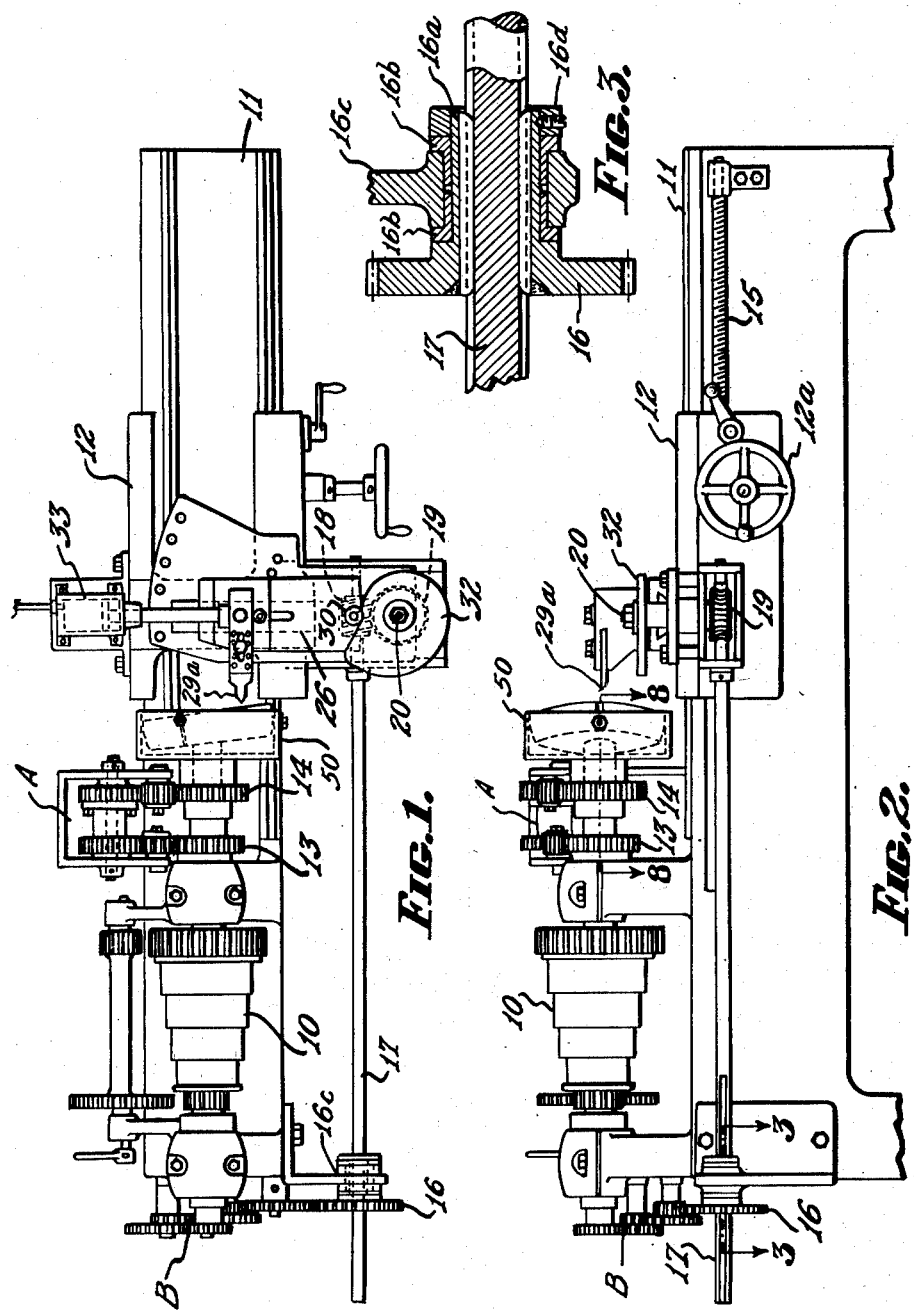

INVENTORS.
SHELDON S. L. CHANG
AND GILBERT H. HAGERMAN,
BY

ATTORNEYS.

Patented Aug. 28, 1951

2,566,116

UNITED STATES PATENT OFFICE 2,566,116

MACHINE FOR FORMING A DISK-LIKE WORKPIECE WITH SPIRAL THREADS

Sheldon S. L. Chang, Springfield, and Gilbert H. Hagerman, Donnelsville, Ohio, assignors to Robbins & Myers, Inc., Springfield, Ohio, a corporation of Ohio Application February 25, 1950, Serial No. 146,334

12 Claims. (Cl. 82—5)

1

This invention relates to a machine of the lathe type for forming disc-like workpieces with spiral threads, either single or double threads wherein the threads have a rounded cross section of hills and valleys.

It is an object of the present invention to provide a machine of the lathe type whereby a workpiece as described above may be machined in one or more straight cross feeds of a cutting tool as the workpiece is rotated.

It is another object of the present invention to provide a machine which will hold and rotate a workpiece in such a manner that as a cutting tool is fed across it in a straight line the cutting tool will generate a spiral thread or threads. It is still another object of the present invention to provide a machine tool as outlined above which will be capable of machining workpieces of the class described with allowance for considerable variation in the specific design as to number of threads, pitch of the threads and contour of the threads.

The foregoing and other objects of our invention which will be described in more detail hereinafter or which will be apparent to one skilled in the art upon reading these specifications we accomplish by that certain construction and arrangement of parts of which we shall now describe an exemplary embodiment.

Reference is made to the drawings forming a part hereof and in which:

Figure 1 is a plan view of a machine according to our invention.

Figure 2 is a front elevational view of the same.

Figure 3 is a fragmentary cross sectional view on an enlarged scale taken on the line 3—3 of Figure 2.

Figure 4:
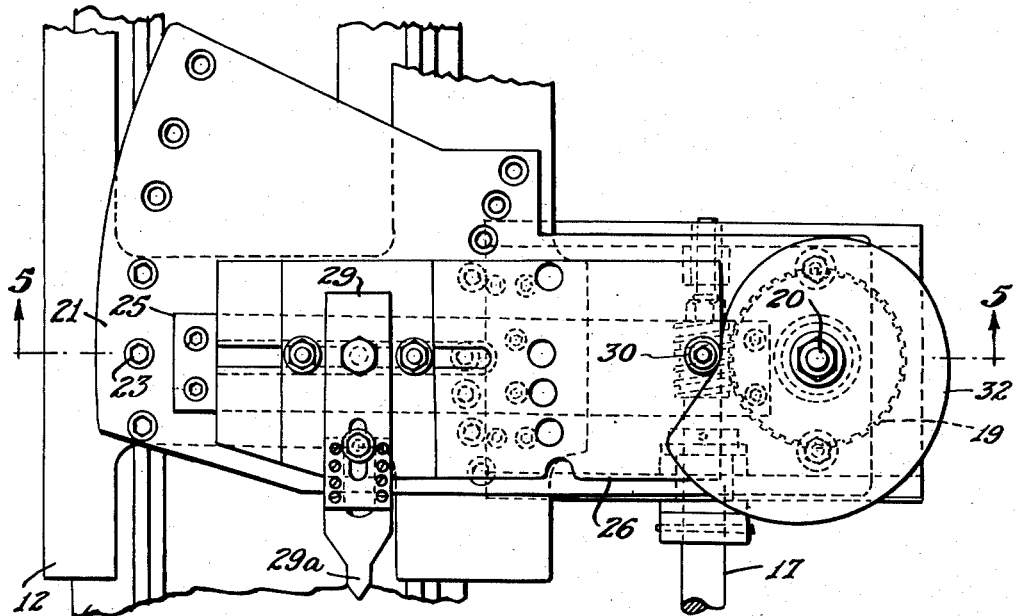
Figure 4 is an enlarged fragmentary plan view of the carriage, slide carrier and cross slide mechanism of the machine.

Briefly, in the practice of our invention we provide a machine of the lathe type having a

2 head stock with a rotatable spindle. A chuck is arranged to be driven by the spindle at spindle speed, and said chuck is provided with a nonaxial bore and a face normal to the bore. A face plate having a stub shaft is arranged for rotation of the stub shaft in the non-axial bore, and a supplementary chuck is provided which is driven through gearing at a speed different from spindle speed. The supplementary chuck and face plate are connected so that relative rotation between them is prevented but so that relative tilting movement is permissible.

Referring now in more detail to the drawings, we have shown in Figures 1 and 2 a machine of the lathe type having a spindle driven from a suitable source of power through belting and a cone pulley 10. The machine has a bed 11 and a conventional carriage 12 which is arranged for movement parallel to the machine spindle on the bed 11. The gear 13 is fast with the spindle and therefore rotates at spindle speed. The gearing indicated generally at A connects the gear 13 with a gear 14 in such manner that the gear 14 rotates at a speed different from spindle speed. In our preferred embodiment the gearing A is such that the gear 14 makes one revolution more than the gear 13 in every 960 revolutions of the latter.

Figure 5:
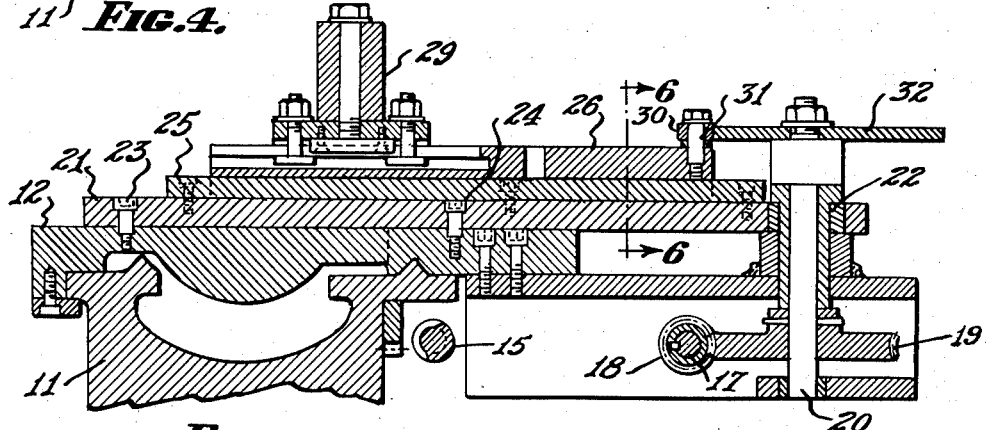
Figure 5 is a cross sectional view of the same taken on the line 5—5 of Figure 4.

By means of more or less conventional back gearing indicated generally at B the rotation of the spindle is transmitted to the conventional lead screw 15 which is not used according to our present invention. This same gearing however is used to transmit motion to the gear 16 which is splined on a shaft 17 to the other end of which is secured the worm 18 which meshes with the worm wheel 19. The worm wheel 19 is secured to a shaft 20 (as best seen in Figure 5) which operates the mechanism to be described hereinafter for producing a tool feed. As best seen in Figure 3, the gear 16 has an elongated hub 16a which has its bearing in bronze bushings or the like 16b in a bracket 16c forming a part of the machine frame. The parts are held in place by means of a collar 16d as shown. By this construction a driving torque is transmitted by the gear 16 to the shaft 17, even when the shaft 17 is moved axially in positioning the carriage 12 by rotation of the handwheel 12a.

Figure 6:
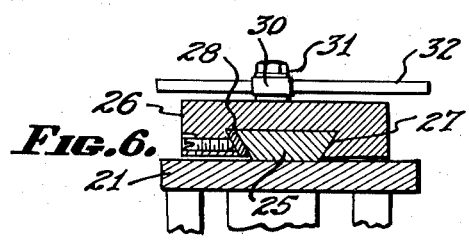
Figure 6 is a fragmentary cross sectional view taken on the line 6—6 of Figure 5.

Referring now in more detail to Figures 4, 5 and 6, it will be observed that the carriage 12 rides upon ways on the bed 11 in conventional manner. The numeral 21 designates the slide carrier and as shown in Figure 5 the slide carrier 21 is provided with a bushed hole 22 by means of which it pivotally engages the shaft 20. Screws 23 and 24 passing through the member 21 and engaging in tapped holes in the carriage 12 secure the member 21 in any desired position of adjustment. As best seen in Figure 4, there are a plurality of positions of adjustment for the groove 23 arranged in an arc about the center of the shaft 20 and a similar group of tapped holes also arranged about the center of the shaft 20 for the screws 24.

As best seen in Figure 6, the slide carrier 21 is provided with the dovetail 25, and the cross slide 26 is arranged for movement upon the slide carrier 21 by means of a dovetail slot 27. The usually gib structure may be provided as at 28.

From the foregoing it will be clear that the cross slide 26 may move back and forth on the carrier 21 and since the position of the carrier 21 may be angularly adjusted, it will be clear that a tool feed can be made directly normal to the spindle axis or at various angles thereto.

The cross slide 26 is provided with a more or less conventional tool post structure indicated generally at 29.

Figure 8:
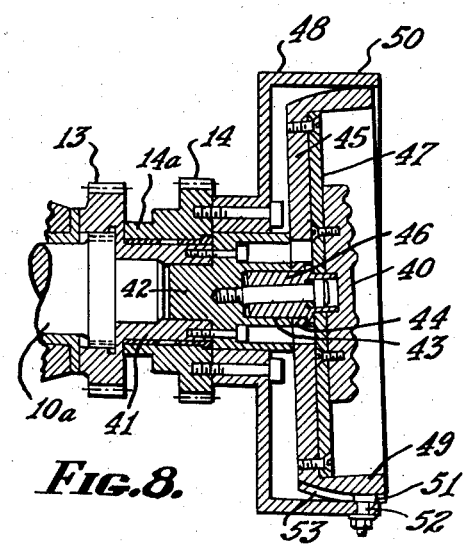
Figure 8 is a cross sectional view taken on the line 8—8 of Figure 7.
Figure 7:
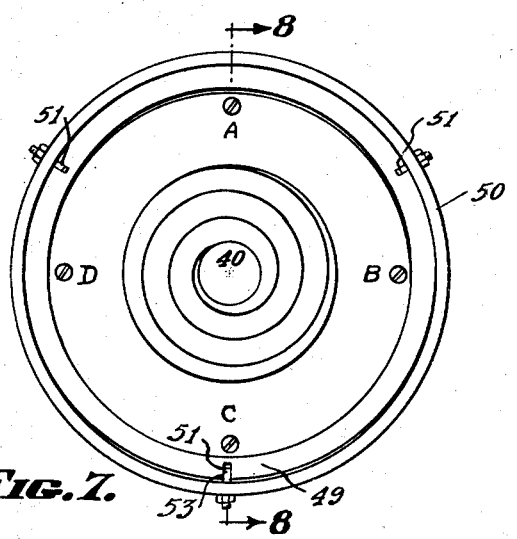
Figure 7 is an elevational view of the holding device or chuck showing one type of workpiece which can be machined.

A contact roller 30 is rotatably mounted on the cross slide 26, as by means of the bolt 31. The shaft 20 carries at its upper end a cam 32 in position to engage the contact roller 30. As best seen in Figure 1, means are provided for urging the cross slide downward in Figure 1 so as to urge the roller 30 into intimate engagement with the cam 32. Such means may consist of a hydraulic cylinder and piston structure generally indicated at 33. From the foregoing description it will be understood that as the spindles rotate the drive is transmitted through the gearing B, through the gear 16 to the spline shaft 17, worm 18, worm wheel 19, shaft 20, to the cam 32. As the cam 32 slowly rotates in a counter-clockwise direction, as seen in Figure 1, the cross slide 26 is caused to move upwardly in Figure 1 against the pressure of the mechanism 33 to feed the tool 29a across the workpiece. As described above, the tool may be fed across at any one of a number of angles Reference is now made more particularly to Figures 7 to 9 inclusive. In Figure 7 there is shown the chucking arrangement for the workpiece which is indicated generally at 40. The spindle of the machine is indicated at 10a, and it will be seen that the gear 13 is keyed to the spindle. The gear 13 has an elongated hub 41 to which is bolted a chuck member 42. The chuck member 42 has a non-axial bore 43 and a face 44 which is normal to the axis of the non-axial bore.

A face plate member 45 is provided with a stub shaft 46 arranged in the non-axial bore 44 so that the face plate 45 is capable of rotation with respect to the chuck member 42 about the axis of the stub shaft 46. The workpiece 40 is secured to the face plate 45, preferably through the intermediary of a disc 47 which itself is secured to the face plate 45.

The gear 14 also has an elongated hub 14a which is arranged to ride on bushings over the sleeve or hub 41 of the gear 13. Secured to the gear 14 is a chuck member 48. It will be recalled from what was said before, that through the gearing indicated generally at A the gear 14 is caused to rotate at a speed different from spindle speed. We prefer that the gear 14 rotate faster than spindle speed and preferably one revolution per minute faster. Thus in actual practice we have caused the gear 13 to rotate at 960 R. P. M. and through the gearing A the gear 14 has been caused to rotate at 961 R. P. M. The object of the difference of one revolution per minute between the speeds of the gears 14 and 13 is to cause the workpiece 40 to make one revolution with respect to the member 48 per minute.

It will be observed that the face plate 45 is provided with an annular flange 49 having an arcuate conformation on its exterior. It will also be noted that the chuck member 48 is provided with an annular flange 50 which embraces the arcuate flange 49. A roller 51 is secured to the flange 50 by means of a pin 52 and engages in a slot 53 in the arcuate flange 49. By this mechanism relative rotation between the members 45 and 48 is prevented, but a relative tilting movement between them is permitted.

The result of the construction described above is that when the gear 13 rotates 960 times the workpiece 40 has made an additional revolution which has caused its position to tilt with respect to the member 48 through a complete cycle. Suppose for example, that four positions A, B, C, and D, 90° apart from each other are marked on the face plate, and that the mark A is tilted towards the cutter at the start. After 240 revolutions of the spindle, the position of tilt has shifted gradually from position A to position B. After another 240 revolutions the position of tilt has shifted from position B to position C and so on. Thus, the position of tilt of the face plate rotates one revolution while the face plate rotates 961 revolutions.

As the tool is fed across the workpiece while the workpiece is undergoing the complex motion above described the spiral thread surface is formed in effect by a number of concentric circles, each of different diameter than all others, which circles are tilted at an angle $a$ with the direction of tilt rotating as the circles increase in diameter. The angle $a$ is the same as the angle between the spindle axis and the stub shaft. The general appearance of the finished workpiece is shown in Figure 7.

Figure 9:
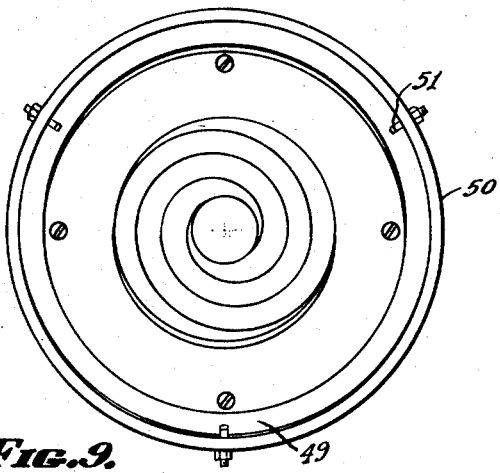
Figure 9 is a view similar to Figure 7 showing a different workpiece.
Figure 10:
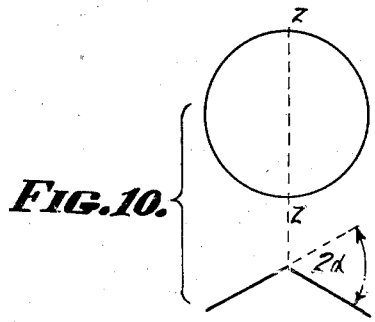
Figure 10 is a diagram to assist in the understanding of Figure 9.

If the workpiece is rotated 180° on the face plate, and the above cutting operation is repeated, the finished work piece would have a double threaded surface, as shown in Figure 9. The surface is formed in effect by a number of concentric circles, each of different diameter than all others, which circles are folded on a diameter over an angle $2a$, with the folding line ZZ (Figure 10) rotating as the circles increase in diameter.

While we have described the machine in considerable detail it will be understood that numerous modifications may be made without departing from the spirit of our invention. No limitations are intended therefore except those which appear in the claims appended hereto.

Having now fully described our invention, what we claim as new and desire to secure by Letters Patent is:

1. In a machine for forming a disc-like workpiece with spiral threads, said machine having a headstock with a rotatable spindle, a faceplate tilted for rotation about an axis at an angle to the axis of rotation of said spindle, means for driving the faceplate on said tilted axis at a speed slightly different from the speed of said spindle, and means for preventing relative rotation of said faceplate and spindle while permitting relative tilting movement therebetween.

2. In a machine for forming a disc-like workpiece with spiral threads, said machine having a headstock with a rotatable spindle, a chuck driven by said spindle at spindle speed and having a non-axial bore and a face normal to said bore, a face plate having a stub shaft arranged in said bore, said face plate being capable of rotation about the axis of said stub shaft, a supplementary chuck coaxially mounted with respect to said spindle and driven at a speed different from spindle speed, and means for preventing relative rotation of said supplementary chuck and face plate while permitting relative tilting movement therebetween, and means for feeding a cutting tool along a line generally transverse to said spindle at a rate bearing a definite relationship to spindle speed.

3. In a machine for forming a disc-like workpiece with spiral threads, said machine having a headstock with a rotatable spindle, a chuck driven by said spindle at spindle speed and having a non-axial bore and a face normal to said bore, a face plate having a stub shaft arranged in said bore, said face plate being capable of rotation about the axis of said stub shaft, a supplementary chuck coaxially mounted with respect to said spindle and driven at a speed greater than spindle speed, and means for preventing relative rotation of said supplementary chuck and face plate while permitting relative tilting movement therebetween, and means for feeding a cutting tool along a line generally transverse to said spindle at a rate bearing a definite relationship to spindle speed.

4. In a machine for forming a disc-like workpiece with spiral threads, said machine having a headstock with a rotatable spindle, a chuck driven by said spindle at spindle speed and having a non-axial bore and a face normal to said bore, a face plate having a stub shaft arranged in said bore, said face plate being capable of rotation about the axis of said stub shaft, said face plate having an annular flange of arcuate cross-section, a supplementary chuck coaxially mounted with respect to said spindle and having an annular flange embracing the arcuate annular flange on said face plate, a slot and pin connection between said supplementary chuck and said face plate while permitting relative tilting movement therebetween, gearing connecting said spindle with said supplementary chuck to drive said supplementary chuck at a speed slightly different from spindle speed, and means for feeding a cutting tool along a line generally transverse to said spindle at a rate bearing a definite relationship to spindle speed.

5. In a machine for forming a disc-like workpiece with spiral threads, said machine having a headstock with a rotatable spindle, a chuck driven by said spindle at spindle speed and having a non-axial bore and a face normal to said bore, a face plate having a sub shaft arranged in said bore, said face plate being capable of rotation about the axis of said stub shaft, said face plate having an annular flange of arcuate cross-section, a supplementary chuck coaxially mounted with respect to said spindle and having an annular flange embracing the arcuate annular flange on said face plate, a slot in said arcuate annular flange and a guide roller mounted on said embracing annular flange and engaging in said slot to prevent relative rotation between said supplementary chuck and said face plate while permitting relative tilting movement therebetween, gearing connecting said spindle with said supplementary chuck to drive said supplementary chuck at a speed slightly different from spindle speed, and means for feeding a cutting tool along a line generally transverse to said spindle at a rate bearing a definite relationship to spindle speed.

6. In a machine for forming a disc-like workpiece with spiral threads, said machine having a headstock with a rotatable spindle, a chuck driven by said spindle at spindle speed and having a non-axial bore and a face normal to said bore, a face plate having a stub shaft arranged in said bore, said face plate being capable of rotation about the axis of said stub shaft, a supplementary chuck coaxially mounted with respect to said spindle and driven at a speed different from spindle speed, means for preventing relative rotation of said supplementary chuck and face plate while permitting relative tilting movement therebetween, a slide carrier on said machine and a cross slide movable on said carrier, means for mounting a cutting tool upon said cross slide, and means for feeding said cross slide along said carrier in timed relation to the rotation of said spindle.

7. In a machine for forming a disc-like workpiece with spiral threads, said machine having a headstock with a rotatable spindle, a chuck driven by said spindle at spindle speed and having a non-axial and a face normal to said bore, a face plate having a stub shaft arranged in said bore, said face plate being capable of rotation about the axis of said stub shaft, a supplementary chuck coaxially mounted with respect to said spindle and driven at a speed different from spindle speed, means for preventing relative rotation of said supplementary chuck and face plate while permitting relative tilting movement therebetween, a carriage on said machine capable of movement parallel to said spindle, a slide carrier on said carriage and a cross slide movable on said slide carrier, means for mounting a cutting tool upon said cross slide, and means for feeding said cross slide along said slide carrier in timed relation to the rotation of said spindle.

8. A machine according to claim 7, in which said cross slide carries a contact roller, and wherein a cam engages said contact roller, and gearing is provided for rotating said cam in timed relation to spindle speed.

9. A machine according to claim 8, in which means are provided for urging said contact roller against said cam.

10. A machine according to claim 7, in which said slide carrier is arranged for pivotal movement upon said carriage and in which means are provided for locking said slide carrier in any one of a number of angular relationship to said carriage, whereby the direction of feeding movement of said tool in relation to the spindle axis may be varied.

11. A machine according to claim 10, in which said cross slide carries a contact roller, and wherein a cam engages said contact roller, and gearing is provided for rotating said cam in timed relation to spindle speed.

12. A machine according to claim 11, in which means are provided for urging said contact roller against said cam.

SHELDON S. L. CHANG.
GILBERT H. HAGERMAN.

No references cited.